No. 852,496. PATENTED MAY 7, 1907.
E. CAREY.
HARVESTING MACHINE.
APPLICATION FILED FEB. 26, 1906.

3 SHEETS—SHEET 1.

Witnesses:
Adelaide Kearns
K. E. Randle

Inventor
Enos Carey
By Robert W. Randle
Attorney.

THE NORRIS PETERS CO., WASHINGTON, D. C.

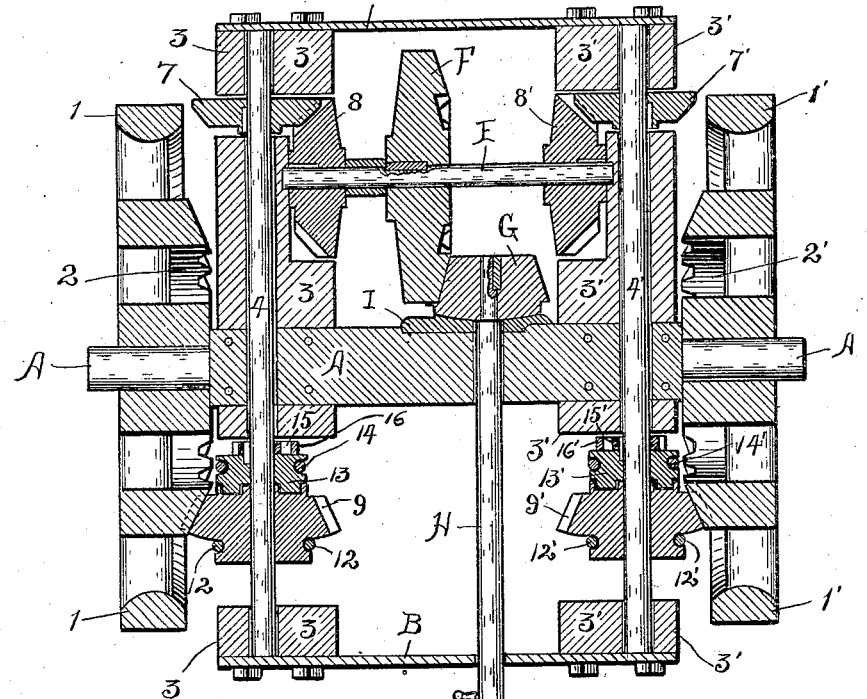

No. 852,496. PATENTED MAY 7, 1907.
E. CAREY.
HARVESTING MACHINE.
APPLICATION FILED FEB. 26, 1906.
3 SHEETS—SHEET 3.
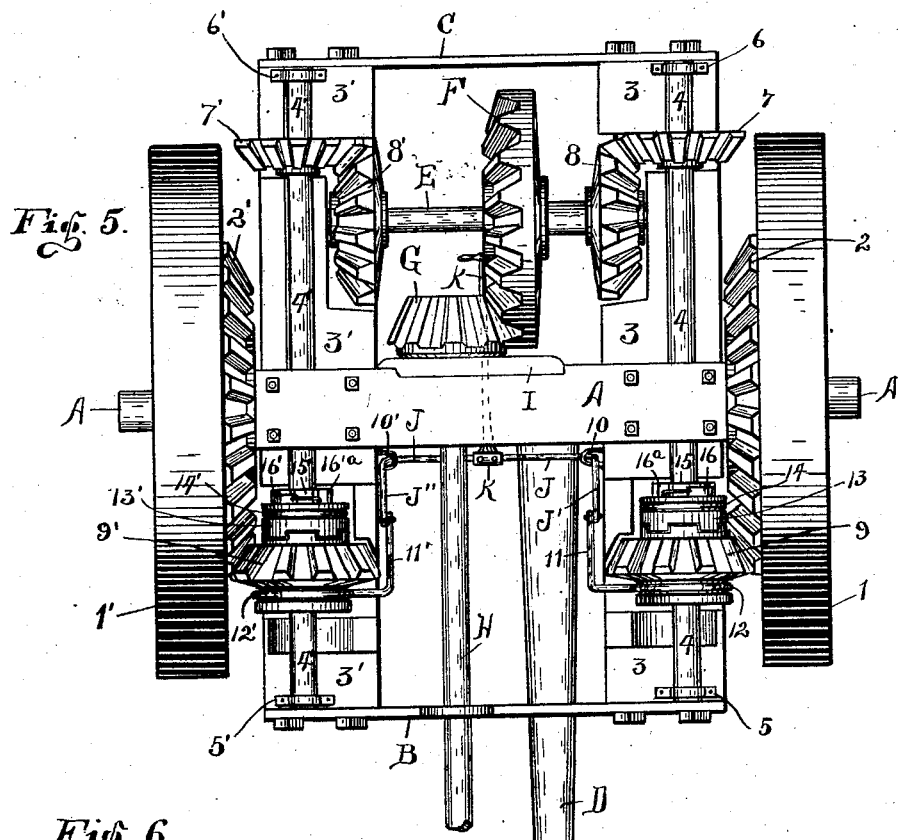
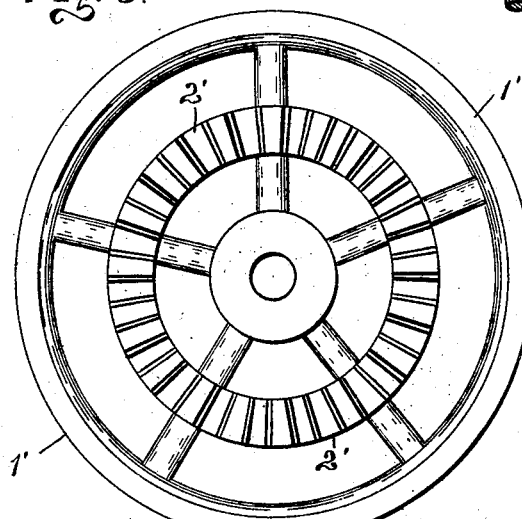
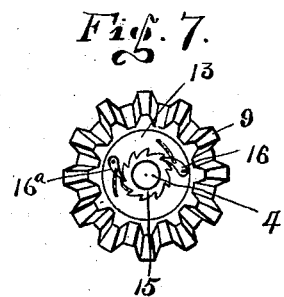
Witnesses:
Adelaide Kearns
H. G. Randle
Inventor
Enos Carey;
By Robert W. Randle
Attorney.

UNITED STATES PATENT OFFICE.

ENOS CAREY, OF GRANT COUNTY, INDIANA.

HARVESTING-MACHINE.

No. 852,496.      Specification of Letters Patent.      Patented May 7, 1907.

Application filed February 26, 1906. Serial No. 302,873.

*To all whom it may concern:*

Be it known that I, ENOS CAREY, a citizen of the United States, residing in Grant county and in the State of Indiana, have invented new and useful Improvements in Harvesting-Machines, of which the following is a full and comprehensive exposition and specification, such as will enable others familiar with the art to which this invention appertains to make and use the same with absolute exactitude.

My present invention relates to improvements in harvesting machines or the like, and more particularly to the draft-frame and operating gears, and means for positively and fully throwing the machine into and out of gear, and means for equalizing the strain on the gear mechanism and frame.

Broadly speaking my object is to provide improvements in harvesting machinery which will be simple and practical in construction, positive in action, strong and durable in construction, and which can be manufactured and sold at a comparatively low price, and at the same time providing such a construction which may be employed in connection with various kinds of machines, and machines for various purposes, the several details being suitably modified to meet the various desired applications to which the invention is applicable.

Other minor objects and particular advantages will present themselves in the course of the ensuing specification.

One manner for the carrying out of the objects stated, and that which I have determined to be the most practical, is exemplified in the accompanying drawings, in which—

Figure 1:
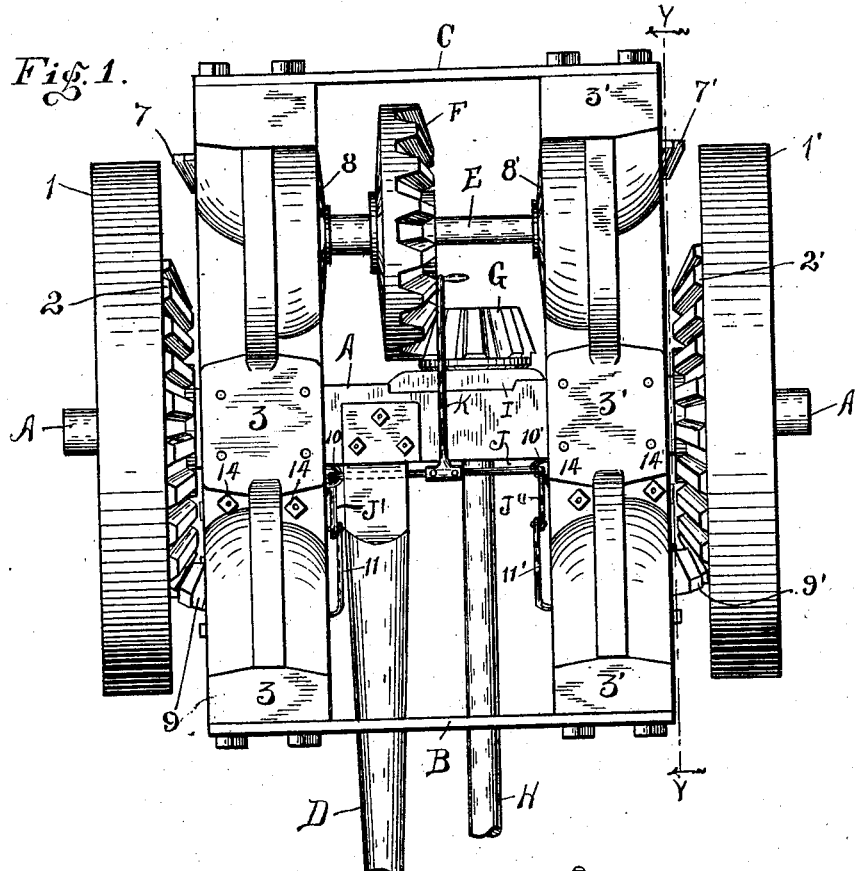
Figure 2:
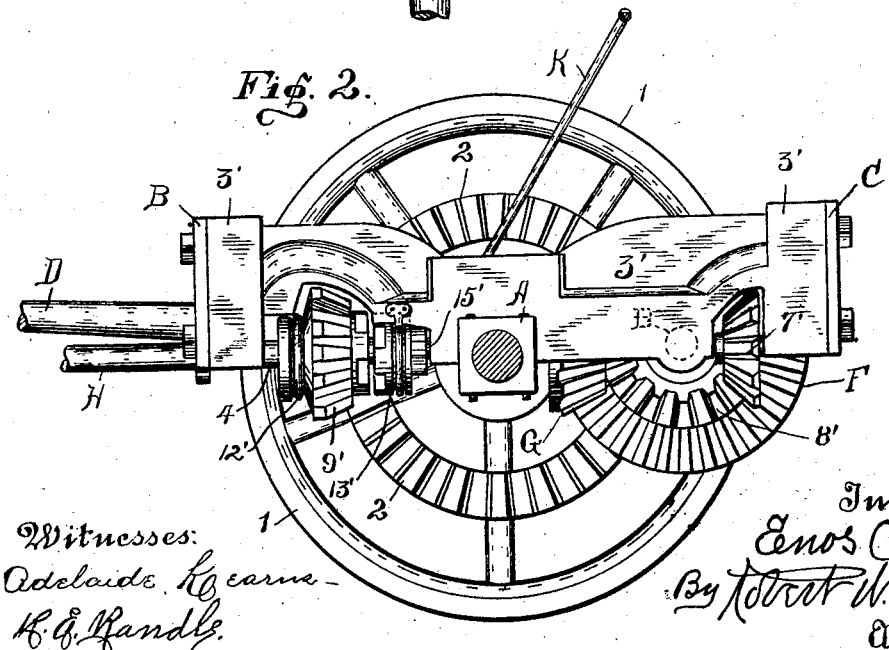

Figure 1 is a plan view of my entire invention; Fig. 2 is a side elevation thereof, the near traction-wheel being removed, and as taken on the line Y—Y of Fig. 1 and taken in the direction indicated by the arrows on said line; Fig. 3 is a horizontal central sectional view of the machine, as taken on the line X—X of Fig. 4, and as taken in the direction indicated by the arrows on said line; Fig. 4 is a front elevation of my machine; Fig. 5 is a plan view of the under side of the machine; Fig. 6 is an inside face view of one of the traction wheels; and Fig. 7 is rear-face view of one of the clutches.

Similar reference characters denote like parts throughout the several views of the drawings.

In order that my invention may be understood and its several advantages fully appreciated I will now take up a detail description thereof and will refer to and describe the construction and operation of the several parts as comprehensively and as briefly as I may.

By reference to the accompanying drawings it will be noted that a majority of the parts shown on one side of the machine are duplicates of like parts on the opposite side thereof, therefore, for convenience of description, I will refer to the parts on the right-hand side of the machine by numerals, and the like or concert parts on the left by similar numerals with exponents, and where the parts are single they will be denoted simply by letters.

In the drawings the numerals 1 and 1' designate the traction or ground wheels of my machine, which wheels are revolubly mounted on spindles therefor on the main-axle A in any well known manner, the body of said axle A, between the wheels, being formed substantially square. Formed integral with the inner faces of the wheels 1 and 1' are the respective bevel gear pinions 2 and 2', which consequently revolve at all times with their respective wheels.

Mounted on the main-axle A, and located parallel with each other, are the main sills 3 and 3', being notched or gained over the axle A and secured by bolts thereto, substantially as indicated in Fig. 1. The ends of said sills are connected by the respective front and rear ties B and C; said ties being connected to the ends of the sills by bolts as shown. Secured to the axle A, immediately to the right-hand side of the center thereof, is the tongue D which extends forward through an aperture therefor formed through the tie B, and it provides means for attaching to the machine for its propulsion.

Channels are formed in the underfaces of the sills 3 and 3', longitudinally thereof, in which may revolve the shafts 4 and 4', respectively, said shafts of course extending through apertures therefor formed through the axle A, as shown in Fig. 3. The ends of shafts abut the cross-ties B and C which prevent the shafts from moving endwise; the axle holding revolubly the central portion of said shafts; and the end portion of said shafts are held in the channels therefor by the caps 5—6 and 5'—6', respectively, as shown in Fig. 5. Secured on the rear portions of the shafts 4 and 4' are miter-gear wheels 7 and 7', respectively, spaces being formed in the sills for that purpose as indicated in Fig. 2.

Mounted revolubly between and carried by the rear portions of the sills 3 and 3' is the intermediate shaft E, on the end portions of which are secured the miter-gear wheels 8 and 8', which latter mesh continuously with the miter-gear wheels 7 and 7', respectively. Also secured on the shaft E, slightly to the right of the center thereof, is the bevel-gear F, meshing with the miter-pinion G. The said miter-pinion G is secured on the rear end of the operative shaft H. The said shaft H extends through apertures therefor formed through the axle A and the tie B, and its outer end may be attached to other parts not shown, as for instance the cutting mechanism. The letter I denotes a contact-plate secured to the rear face of the axle A for the miter-pinion head to contact with, as shown.

Revolubly mounted on the forward portions of the shafts 4 and 4' are the slidable bevel-gear pinions 9 and 9', respectively, which are adapted to mesh with the bevel-gears 2 and 2', respectively, of the traction-wheels as indicated, and which are adapted to slide forward on their respective shafts to disengage them from said bevel-gears 2 and 2' when desired. The means for moving said pinions endwise is controlled by a single lever, and it is shown most clearly in Figs. 1 and 5, and may be described as follows: Extending across between the sills 3 and 3', immediately in front of the axle A, is a rod J having downwardly projecting arms J' and J'' integral therewith and lying near the sills and having right-angular inturned pivots as shown. The rod J is pivoted to the sills 3 and 3' by the hangers 10 and 10', respectively.

From the central portion of the rod J an operating lever K extends upward, as shown, whereby said rod may be rotated. A flange projects forward from the gear-pinions 9 and 9', in the peripheries of which are formed channels for the respective loops 12 and 12'. After encircling their respective channels, as shown, said loops extend inward and then rearward forming the arms 11 and 11' and having their rear ends pivoted to the said pivots of the respective arms J' and J'', of the rod J. By the above described arrangement it is apparent that as the lever K is moved forward and backward the pinions 9 and 9' will be moved synchronously into and out of gear with the respective gears 2 and 2'.

The clutches which I will now describe consists each of disks 13 and 13', which are revolubly mounted on the respective shafts 4 and 4'. The forward faces of said disks are provided with a series of square-cut lugs and corresponding equal indentations to engage the respective indentations and lugs formed oppositely thereto on the faces of the gear-pinions 9 and 9'; and around the peripheries of said disks are formed channels for the hangers 14 and 14', respectively, which extend around thereunder with their ends extending up through the sills 3 and 3', respectively, on the upper faces of which they are secured by nuts, as indicated in Fig. 1, by which arrangement said disks are prevented from longitudinal movement along the shafts but are revoluble thereon. Permanently secured on the shafts 4 and 4' and contacting with the rear faces of the respective disks 13 and 13' are the ratchet wheels 15 and 15'. Mounted on the rear faces of the disks 13 and 13' are the respective pawls 16—16$^a$ and 16'—16'$^a$, as indicated most clearly in Fig. 7. Said pawls are resiliently held in contact with the respective ratchet wheels by springs therefor as indicated. A cavity is formed in the sills 3 and 3' for the respective ratchet mechanism and for the respective gear pinions to operate in, the latter having sufficient space for their forward and backward movements.

Operation: From the above it will have been determined that the operation of my invention is comparatively simple and unique, in that the construction may be propelled by attachment to the tongue and carried over the ground on the traction wheels. When being moved merely for the purposes of transportation the lever K is turned back which will disconnect the gears 9 and 9' from their respective gears 2 and 2', and thereby allowing the traction wheels to turn idly on the axle,—at which time every part of the mechanism will be inoperative and will remain relatively stationary the same as if it were being transported by a wagon. Should the lever K be turned forward then the gears 9 and 9' will engage with the gears 2 and 2', at the same time the gears 9 and 9' will engage the disks 13 and 13' and, if the machine be propelled forward, the pawls will engage the ratchet wheels aforesaid and they in turn will revolve the shafts 4 and 4', and the latter by means of the gear wheels 7 and 7', and 8 and 8', will revolve the shaft E, and it in turn the shaft H by the means stated. Should the machine for any reason be propelled rearward then the pawls aforesaid will act reversely on the ratchet-wheels without operating the machinery. It should also be noted that should one of the traction-wheels move more slowly than the other, as in turning, then the ratchet mechanism of that wheel will compensate therefor by acting reversely. By this construction it is apparent that both traction wheels contribute, not only to carrying the machine, but acting equally on the machinery and thereby equalizing the strain and reducing the wear and danger of breakage to a minimum. It should also be noted that in this construction I practically provide a twin operating mechanism, whereby if one should become inoperative, inadvertently, then the other may temporarily carry the load. And finally a very important feature is the construction of the frame and the manner of positioning and mounting the various parts thereon, which it is evident forms a very rigid and secure construction, while at the same time allowing for all proper flexibility.

From the above description, taken in connection with the accompanying drawings, it will be seen that I have produced an improved construction for harvesting machines or the like which embody the objects hereinbefore stated, and while I have shown and described the best means now known to me for carrying out my invention in a practical manner I desire that it be understood that I do not restrict myself to the exact details of construction shown and described, but hold that any changes or variations therein as would suggest themselves to the ordinary mechanic would clearly fall within the limits and scope of my invention.

What I claim and desire to secure by Letters Patent of the United States, is—

1. In a harvesting machine, the combination of traction wheels, a frame carried thereby and having side sills provided with longitudinal channels in their lower sides, shafts rotatably retained in said channels, an operative shaft, driving connections between said wheels and said first-named shafts, and driving connections between these shafts and said operative shaft.

2. In a harvesting machine, the combination of a fixed axle having transverse journal apertures, traction wheels mounted loosely on said axle, side sills provided in their lower sides with transverse notches fitting over said axle and with longitudinal channels in alinement with said journal apertures, shafts mounted in said channels and journaled in said apertures, driving connections between the wheels and said shafts, an operative shaft, and driving connections between the same and said other shafts.

3. In a harvesting machine, the combination of traction wheels, a frame carried thereby and comprising side sills provided with longitudinal channels in their lower sides, said frame comprising also end ties rigidly connecting said sills, shafts rotatably retained in said channels and abutting at their ends against said ties, driving connections between said wheels and said shafts, an operative shaft, and driving connections between the same and said other shafts.

4. In a harvesting machine, the combination of traction wheels, a frame carried thereby and having side sills provided in their under sides with longitudinal channels and with end recesses, shafts rotatably retained in said channels, an operative shaft, and gears mounted on the ends of said first-named shafts within said recesses and constituting driving connections between said shafts and the wheels and between said shafts and said operative shaft respectively.

5. In a harvesting machine, the combination of traction wheels, a frame carried thereby and having side sills provided with longitudinal channels formed in their lower sides, longitudinal shafts rotatably retained in said channels and having driving connection with said wheels, a transverse shaft driven from said other shafts, and an operative shaft disposed longitudinally intermediate said other longitudinal shafts and driven from said transverse shaft.

6. In a harvesting machine, the combination of a fixed axle having transverse journal apertures, traction wheels mounted loosely on said axle, side sills provided in their under sides with transverse notches fitting over said axle and with longitudinal channels in alinement with two of said journal apertures, shafts mounted in said channels and journaled in said two journal apertures, driving connection between said wheels and said shafts, an operative shaft journaled in another of said transverse apertures, and driving connection between said shaft and the first-named shafts.

7. In a harvesting machine, the combination of traction wheels, a frame carried thereby and having side sills provided on their under sides with longitudinal channels, shafts rotatably retained in said channels, a gear carried by each wheel, a gear splined on the front of each shaft and carrying a clutch member, means for shifting the shaft-carried gears into and out of mesh with said wheel-carried gears, a complementary clutch member mounted loosely on each shaft but retained against longitudinal movement, pawl and ratchet connection between the last-named clutch members and the shafts, an operative shaft, and driving connection between the same and said other shafts.

8. In a harvesting machine, the combination of traction wheels, a frame carried thereby and having side sills provided on their under sides with longitudinal channels, shafts rotatably retained in said channels, an operative shaft driven from said shafts, a gear carried by each wheel, a gear splined on each sill-carried shaft, a complementary clutch member mounted loosely on each of said sill-carried shafts but retained against longitudinal movement, pawl and ratchet connection between the last-named clutch members and the shafts, a transverse rock-shaft having crank arms, yokes encircling said splined gears, connection between said yokes and said crank arms, and an operative lever carried by the rock shaft.

In testimony whereof I have hereunto signed my name to this specification in the presence of two subscribing witnesses.

ENOS CAREY.

Witnesses:
    R. W. RANDLE,
    R. E. RANDLE.